Dec. 19, 1939.   H. A. HORMAN   2,184,223
LETTER PROPORTION VARYING DEVICE
Filed Aug. 14, 1936   2 Sheets-Sheet 1

INVENTOR
HAROLD A. HORMAN.
BY
Martin T. Fisher,
ATTORNEY

Dec. 19, 1939.   H. A. HORMAN   2,184,223
LETTER PROPORTION VARYING DEVICE
Filed Aug. 14, 1936   2 Sheets-Sheet 2
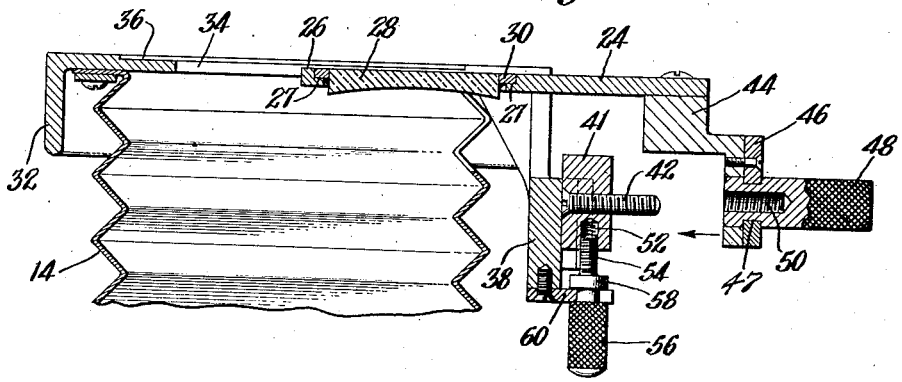
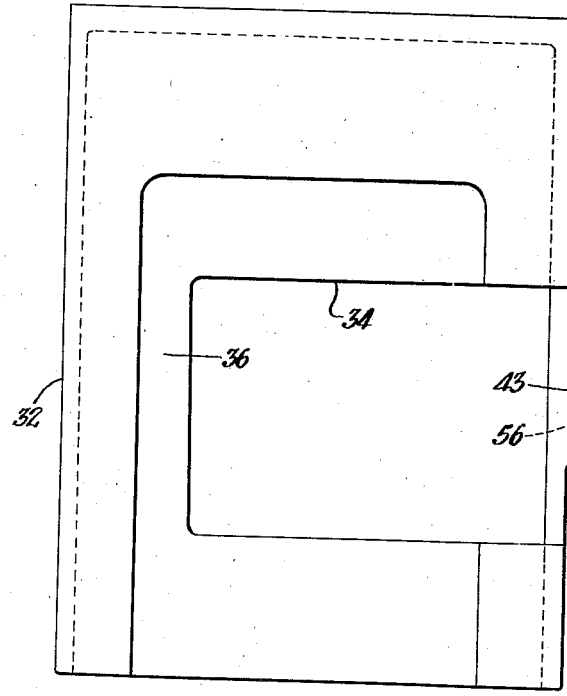
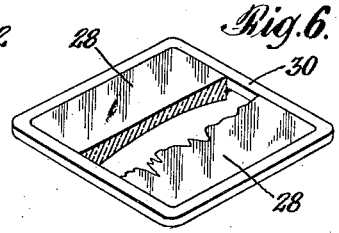
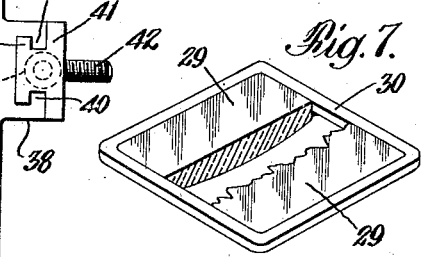
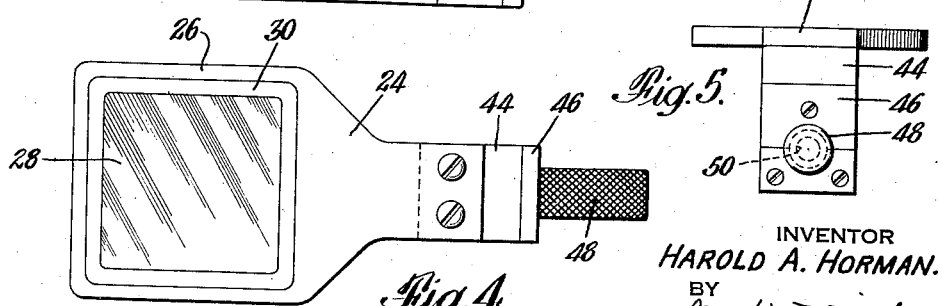
INVENTOR
HAROLD A. HORMAN.
BY
Martin T. Fisher,
ATTORNEY Patented Dec. 19, 1939

2,184,223

UNITED STATES PATENT OFFICE 2,184,223

LETTER PROPORTION VARYING DEVICE

Harold A. Horman, Lyndhurst, N. J., assignor to General Printing Ink Corporation, New York, N. Y., a corporation of Delaware Application August 14, 1936, Serial No. 96,110

7 Claims. (Cl. 95—4.5)

This invention relates to photographic lettering machines of the type illustrated generally in the patents to Ogden No. 1,893,439, dated January 3, 1933, and No. 2,019,764, dated November 5, 1935.

In machines of this character an alphabet plate is used, bearing transparent or translucent letters, numerals, or other appropriate indicia on an opaque background. A beam of light is projected through selected letters of the alphabet plate in proper sequence, thence through a photographic lens, controlled by a shutter, onto a light sensitive surface, and a photograph thereby taken of the letters in proper sequence, for forming or composing the desired words, numbers, etc.

The present invention is a means for varying the proportion of the letter that is projected onto the light sensitive surface. More specifically, it comprises means for positioning a lens or a plurality of lenses, in the light path for enlarging or reducing one dimension of the letter, either the height or width.

The invention, in its preferred embodiment, comprises a lens holding attachment which may be accurately positioned in the path of light and which, after being so positioned, is variably positionable along the optical axis for controlling the amount of the enlargement or the reduction of one dimension of the letter image. This holder carries any one of a series of interchangeable lenses.

For example, if it is desired to enlarge the width of a letter, a plano-convex lens is used, which will widen the projected letter when the axis of the lens is perpendicular to the longitudinal axis of the alphabet plate. If this same lens is turned through 90°, so that its axis is parallel to the longitudinal axis of the alphabet plate, the height of the letter will be increased. The holder will hold any given lens in two positions such that their axes in the two positions are mutually perpendicular.

For reducing the size of the letter, a plano-concave lens is preferably used. When placed in the light path, with its axis perpendicular to the longitudinal axis of the alphabet plate, the projected image of the letter is narrowed. When such a lens is turned 90° the projected image will be shortened.

The amount of the widening or heightening of the letter effected by the plano-convex lens, or the amount of the narrowing or the shortening of the letter effected by the plano-concave lens, may be controlled by variably positioning, with substantially micrometer accuracy, the lens holder and the lens along the optical axis. Other types of lenses could be used, if desired.

In composing with a photo-lettering machine of the character here involved, it is of considerable importance to be able to control, within a suitable range, the width and height of the letters or other indicia used, as these factors are of importance in the artistic appearance of the final job. The use of the attachment of this invention enables the operator to control the size of his letters very quickly, simply by placing the appropriate lens in the lens holder in the proper axial position, and by accurately positioning the lens along the optical axis of the machine.

This present attachment is independent of the main lens of the machine. Once the focus of the main lens of the machine has been set, it can remain set and the changes in the size of the letters effected by the use of the lens holder of the present invention without adjustment of the focal length of the main lens.

The general features of the invention having been thus outlined, reference will now be made to the accompanying drawings, illustrating the present preferred embodiment of the invention.

In these drawings:

Fig. 2 is an enlarged vertical cross section of the lens holding and positioning device and cooperating parts of the machine;

Fig. 3 is a plan view of the same;

Fig. 4 is a plan view of the lens holder;

Fig. 5 is an end view; and

Figs. 6 and 7 are perspective views of plano-concave and plano-convex lenses, respectively, used in the lens holder.

Figure 1:
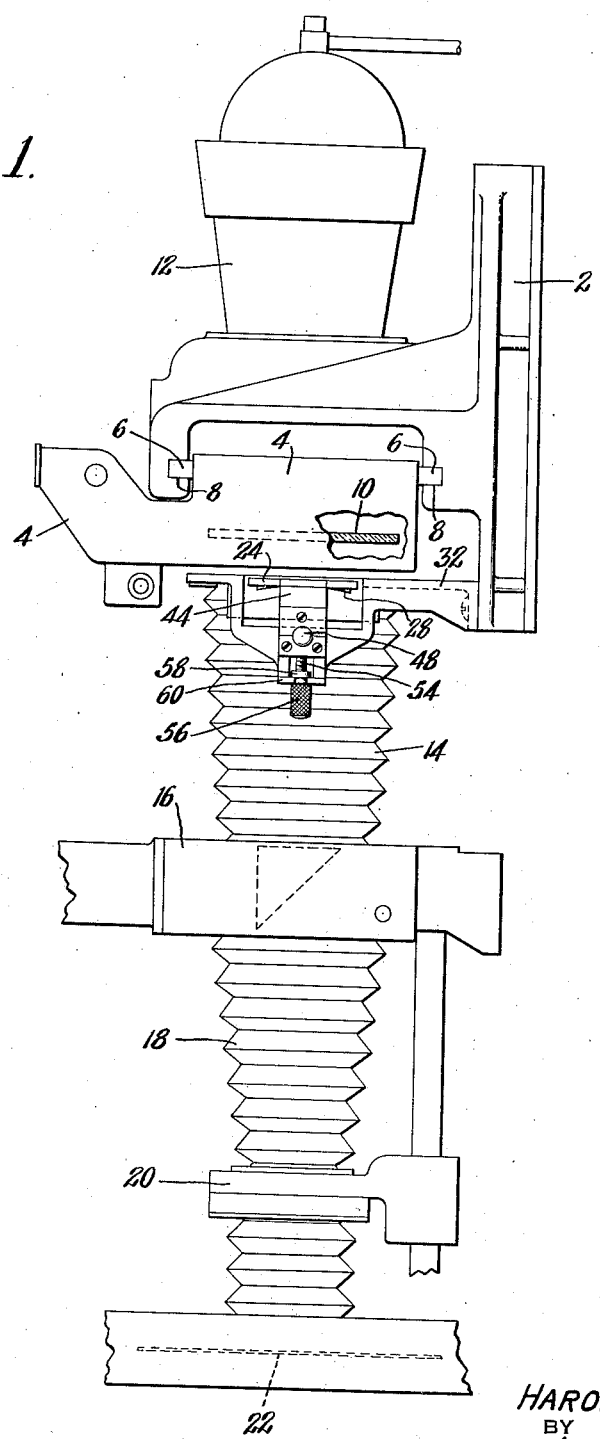
Fig. 1 is a side view, partly in section, of a portion of a photo-lettering machine embodying the lens holding and positioning device of the present invention.

Referring now to these drawings, in which similar reference characters indicate similar parts, 2 indicates one of the main castings at the upper part of the machine. A slidable carriage 4, slidable transversely of the machine by means of guides 6, working in guideways 8 in the casting 2, carries an alphabet plate 10, provided with translucent or transparent letters on an opaque background, as is well understood in this art.

A source of light is mounted in the housing indicated generally at 12 and projects a beam of light through the alphabet plate 10 and bellows 14, through a prism or mirror housing 16, through bellows 18, through the lens in the lens and shutter housing 20, onto the light sensitive sheet 22. The parts just described illustrate the parts of the machine with which the present invention cooperates.

The present invention comprises a lens holder indicated generally at 24, which is provided with a rim 26 defining a square opening for detachably holding an enlarging or reducing lens 28, which is illustrated in Figs. 2 and 6 as a plano-concave or reducing lens. The rim 26 is grooved to provide an inwardly extending depressed shoulder 27. Such lens is preferably provided with a rim 30, cemented or otherwise secured thereto, which is adapted to seat on the shoulder 27 of the holder 24. A plano-convex or enlarging lens 29 is shown in Fig. 7.

The several lenses are interchangeable, and are square, and the opening in the lens holder is square, so that the desired lens may be put in place in the holder with its axis in either of two mutually perpendicular positions.

In order to position the lens holder 24 in the light path, a bracket 32 is mounted on casting 2. This bracket is centrally apertured at 34 for the passage of light, the underside of this bracket being in light-tight connection with the bellows 14. The bracket 32 is grooved to define a shoulder 36, on which may be placed an apertured screen for controlling the amount of light from the light source 12.

In order to mount the lens holder 24 in the light path, there is provided a depending bracket 38, carried by bracket 32. Bracket 38 is provided with outwardly projecting and inwardly turned guide lugs 40, providing a fixed, vertically disposed guideway. A carriage 41, provided with a laterally projecting threaded stud 42, is provided with a portion 43 slidable in the guides 40.

Secured to the lens holder 24 is a bracket 44 provided with an apertured member 46, the edges of the aperture projecting into a groove 47 in a knurled finger piece 48, interiorly threaded at 50. With the swiveled connection thus provided, the threaded socket 50 is screwed onto the stud 42, thereby securing the lens holder to the vertically movable carriage 41.

The lens holder 24 is thus clamped in place in the optical axis of the machine. In order to move the lens holder with a fine or micrometric adjustment in either direction along the optical axis for controlling the amount of the enlargement or contraction of the projected letter, the carriage 41, to which the lens holder is now clamped, is provided with an interiorly threaded socket 52 adapted to be engaged by a threaded stud 54, provided with a knurled adjusting handle 56. The screw 56 is provided with a shoulder 58, engageable with an apertured plate 60, forming a swivel connection for the screw. When, therefore, the screw 56 is turned, the guide 41 is moved up and down and thereby the lens holder 24 is moved up and down or, as here illustrated, along the optical axis of the apparatus, for thereby enlarging or reducing the size of the letter or indicia projected onto the sensitive sheet 22. This movement is parallel to the beam of light, and the several positions assumed by the lens holder are successively parallel to each other.

The plano-concave lens of Fig. 6 will narrow or shorten the letter from its normal size, depending upon the placement of the axis of the lens. The plano-convex lens of Fig. 7 will widen or heighten the letter, depending upon the placement of the axis of the lens. The degree of change in size is controlled by screw 56.

There is thus provided, by the present invention, an attachment which can be positioned and adjusted with micrometer accuracy in the light path for holding and variably positioning a lens for varying the size of the projected letter, without disturbing the focal setting of the main lens.

While the present preferred embodiment of the invention has been illustrated in some detail, it should be understood that the invention is not to be limited to the precise details here described, but may be carried out in other ways, as falling within the scope of the claims.

I claim as my invention:

1. In a photographic lettering machine, the combination with a character bearing plate, a camera lens and a source of light for projecting a beam of light through the character plate and lens onto a sensitized surface, of a bracket positioned to one side of the path of said beam of light, between the character plate and the sensitized surface, means for variably positioning said bracket in a direction substantially parallel to said beam of light, a lens holder for holding a lens in the path of the beam of light, a cylindrical lens in said lens holder, means for detachably securing said lens holder to said bracket so as to be movable therewith, and to be quickly attachable to and removable from said bracket, and means forming a light tight box positioned between said lens holder and the camera lens.

2. In a photographic lettering machine, the combination with a character bearing plate, a camera lens and a source of light for projecting a beam of light through the character plate and lens onto a sensitized surface, of a bracket positioned to one side of the path of said beam of light, between the character plate and the sensitized surface, threaded means for variably positioning said bracket in a direction substantially parallel to said beam of light, a lens holder for holding a lens in the path of the beam of light, a cylindrical lens in said lens holder, and means for detachably securing said lens holder to said bracket so as to move therewith.

3. In a photographic lettering machine, the combination with a character bearing plate, a camera lens and a source of light for projecting a beam of light through the character plate and lens onto a sensitized surface, of a bracket positioned to one side of the path of said beam of light, between the character plate and the sensitized surface, means for variably positioning said bracket in a direction substantially parallel to said beam of light, a lens holder for holding a lens in the path of the beam of light, a cylindrical lens in said lens holder, and threaded means for detachably securing said lens holder to said bracket so as to move therewith.

4. In a photographic lettering machine, the combination with a character bearing plate, a camera lens and a source of light for projecting a beam of light through the character plate and lens onto a sensitized surface, of a bracket positioned to one side of the path of said beam of light, between the character plate and the sensitized surface, means for variably positioning said bracket in a direction substantially parallel to said beam of light, a lens holder for holding a lens in either of two mutually perpendicular positions, each of which is substantially perpendicular to said beam of light, a cylindrical lens in said lens holder, and means for detachably securing said lens holder to said bracket so as to be movable therewith.

5. In a photographic lettering machine, the combination with a character bearing plate, a camera lens and a source of light for projecting a beam of light through the character plate and lens onto a sensitized surface, of a bracket positioned to one side of the path of said beam of light, between the character plate and the sensitized surface, means for variably positioning said bracket in a direction substantially parallel to said beam of light, a lens holder comprising an apertured frame, a cylindrical lens carried by such holder in the aperture of said frame, and readily removable therefrom, means for detachably securing said lens holder to said bracket so as to be movable therewith, and to be quickly attachable to and removable from said bracket, and means forming a light tight box positioned between said lens holder and the camera lens.

6. In a photographic lettering machine, the combination with a character bearing plate, a camera lens and a source of light for projecting a beam of light through the character plate and lens onto a sensitized surface, of a bracket positioned to one side of the path of said beam of light, between the character plate and the sensitized surface, means for variably positioning said bracket in a direction substantially parallel to said beam of light, a lens holder comprising an apertured frame, for holding a lens in either of two mutually perpendicular positions, transverse to and in the path of said light beam, a cylindrical lens in said lens holder, and means for detachably securing said lens holder to said bracket so as to be movable therewith.

7. In a photographic lettering machine, the combination with a horizontally positioned character bearing plate, a camera lens and a source of light for projecting a beam of light vertically downwardly through the character plate and lens onto a sensitized surface, of a bracket positioned to one side of the path of the beam of light, between the character plate and the sensitized surface, means for variably positioning said bracket vertically upwardly and downwardly, a lens holder comprising an apertured frame normally located in a horizontal plane, a cylindrical lens positioned in said holder, means for detachably clamping said lens holder to said vertically movable bracket, and means forming a light tight box from said lens holder to the camera lens.

HAROLD A. HORMAN.